Patented Nov. 28, 1939

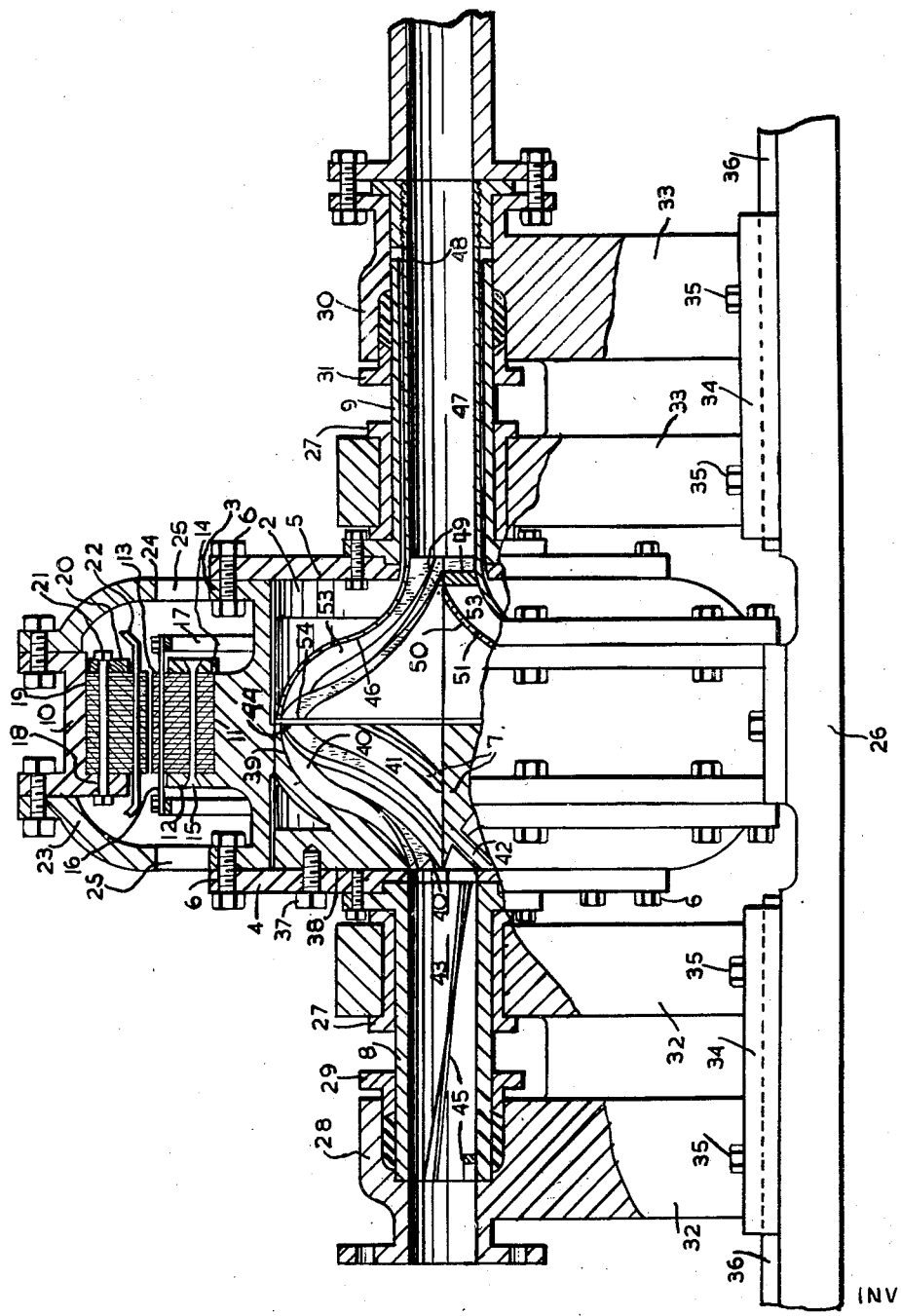

2,181,677

UNITED STATES PATENT OFFICE

2,181,677
ROTARY PUMPING APPARATUS

Arthur Cyrus Whittome, Johannesburg, Transvaal, and Cebert Boardman, Springs, Transvaal, Union of South Africa, assignors to A. C. Whittome (Proprietary) Limited, Johannesburg, Transvaal, Union of South Africa, a company of the Union of South Africa Application August 7, 1937, Serial No. 157,962
In the Union of South Africa September 26, 1936

4 Claims. (Cl. 103—87)

The present invention relates to pumping apparatus comprising a centrifugal pump and a motor for driving such pump.

One object of the invention is to provide a centrifugal pump and its driving motor in a very compact form. Another object of the invention is to provide a pumping apparatus in which the fluid moved by the pump increases the efficiency of the motor in case an electric motor is used.

According to the invention a pumping apparatus comprises a centrifugal pump of the kind comprising a rotating casing with an axial inlet and outlet, and a driving motor the rotor parts of which are mounted on the casing so that said casing forms the shaft of the rotor.

According also to the invention a pumping apparatus comprises a centrifugal pump of the kind in which the casing is internally formed as a centrifugal impeller which causes the fluid to diverge therein from the axial inlet and to be discharged therefrom at a distance from the impeller axis and in the direction of said axis, means being provided to receive the fluid from the impeller and to cause said fluid to be discharged from the axial outlet, and a driving motor, of which the rotor parts are mounted on the casing, said casing forming the shaft of the rotor.

In the preferred embodiment of the invention the motor is an electric motor, the rotor windings of which preferably are short circuited and have no connection to another circuit.

According further to the invention the rotating casing of a pumping apparatus of the aforesaid kind is so constructed and arranged that all parts within said casing which are exposed to the deteriorating action of the fluid are replaceable and can be readily replaced without dismantling the rotor parts, means being provided for easily centralizing the rotating casing with respect to the stator of the driving motor after such replacement.

The bearings for the rotating casing are supported by a frame which also supports the stator of the motor in its proper axial position.

One form of the invention is shown in the accompanying drawing in part sectioned elevation.

In the drawing, 2 indicates the rotating casing comprising a cylinder 3, two end plates 4 and 5 secured to the cylinder by bolts 6 and the hollow shafts 8 and 9 bolted to the plates 4 and 5 respectively.

In the shown form of the invention an electric motor is used and its rotor parts are mounted on the part of the rotating casing forming the cylinder.

The cylinder 3 is provided with a lamination seating 11 and the flange 12, said two parts supporting the laminations 13 of the rotor which are held in position by means of the end cheek 14 and bolts 15. In each slot of the laminations there is arranged a single conductor 16 which is lightly insulated from the laminations 13, all of said conductors being short-circuited at their ends by means of the rings 17. The whole structure represents a squirrel cage rotor the shaft of which is formed by the rotating casing 2.

The stator of the motor comprises the outer casing 10 provided with the flange 18, the laminations 19 secured to the casing by the end cheek 20 and the bolts 21 engaging the flange 18, windings 22 provided in the slots of the laminations 19, means for connecting said windings to an outer circuit (not shown) and the two end shields 23, 24 bolted to the outer casing. The end shields are provided with openings 25 the diameter of which is greater than the diameter of the plates 4 and 5.

The outer casing 10 is bolted to the base plate 26. The hollow shafts 8 and 9 are supported in bearings 27, 27. The shaft 8 enters a fixed conduit 28 fitted with a stuffing box 29. The shaft 9 similarly enters a fixed conduit 30 fitted with a stuffing box 31. The bearings 27, 27 and the fixed conduits 28, 30 are supported by pillars 32, 32 and 33, 33 flanged at their lower ends 34. Said ends 34 are fixed to the base plate 26 by the bolts 35. The base plate 26 is provided with guiding members 36, 36 fitting into corresponding recesses of the pillars and by which the pillars 34 are kept parallel to the axis of the pump when moved for the purpose of replacing deteriorated parts.

The bearings for the shafts 8 and 9 of the rotating casing supporting the rotor parts of the motor being supported by the same base plate which also supports the outer casing of the stator, rotor and stator are kept in their co-axial position with respect to each other. The rotating casing and the stator being mounted on the same base plate the driving forces are well balanced which is otherwise very difficult to be achieved with pumping apparatus comprising a rotating casing of the above described kind.

The impeller 7 is positioned in the left hand end of the barrel 3 and is secured to the plate 4, as by screw bolts 37. It comprises a part 38 which defines the outer walls 39 of the impeller passages 40, a co-axial boss 41 which defines the inner walls of the passages, and vanes 42 connecting the parts 38 and 41. In the shown embodiment of the invention the parts 38, 41 and 42 form one integral structure. An impeller of this kind, the single parts of which are rigidly connected to one another, so as to form a single unit which can be fixed to the cylinder as a whole will be termed an "impeller unit". Each impeller passage 40 extends from the inlet passage 43 in the hollow shaft 8 in a double curve which starts axially, diverges from the axis, and terminates parallel to the axis at a discharge mouth 44 distant from the axis.

Vanes 45 may be provided on the inner surface of the rotating inlet passage 43, and have the effect of imparting an initial rotation to the fluid passing through said passage before it enters the impeller proper.

46 indicates a funnel which is adapted to receive the liquid from the discharge mouths 44. The funnel 46 converges towards an axial outlet passage 47 which is defined by the tubular extension 48 of said funnel, said extension being secured, e. g., screwed, in a part of the fixed conduit 39. Secured in this manner, the funnel 46 is stationary and retards the rotation, about the axis, of the liquid discharged from the mouths 44 into the funnel. Such rotation of the liquid is further diminished by vanes 49 which are fixed in the funnel 46 to extend inwardly thereof. A conoidal formation 50 defined by an inner wall 51 fills the space 52 on the outlet side of the impeller and prevents eddying of liquid in said space. The inner wall 51 is, in the case shown, supported co-axially within the funnel 46 by the vanes 49, and in conjunction with the funnel 46, forms an annular passage 53 with an annular receiving mouth 54 which registers with the impeller discharge mouths 44. Fluid receiving means of this kind, the inner parts of which are fixed to and are supported by an outer member, will be termed the "fluid receiving unit".

In operation, upon the cylinder being rotated, fluid in the passages 40 is acted upon by the vanes 42 and centrifugally driven to the discharge mouths 44. The fluid is discharged into the annular passage 53 wherein its rotational movement is diminished with consequent decrease of its centrifugal action. This enables the fluid to converge in the passage 53 and to be displaced along said passage by the incoming fluid to the axis and to the outlet passage 47.

With the electric motor elements mounted on the casing as above described, cold fluid passing through the casing withdraws heat generated by said elements, thus increasing the efficiency of the motor.

The impeller unit and the fluid receiving unit can be replaced as follows: The bolts 6 securing the end plate 5 and the bolts 35 fastening the right hand pillar end 34 are drawn back and the pillars 33, 33 with all parts attached to and supported by them are moved along the guiding member 36 to the right until the fluid receiving unit is well out of the cylinder 3. The screws 37 are removed, the impeller unit is taken out of the cylinder 3 and replaced by a new one which in turn is fixed by screws 37 to the end plate 4. The fluid receiving unit is screwed out of the fixed conduit 39 and a new one is screwed in instead. Thereupon the pillar 33, 33 is moved along the guiding member 36 into its operating position and the bolts 35 and 37 are fastened.

We claim:

1. A centrifugal rotary pumping apparatus comprising fixed co-axial inlet and outlet conduits, a hollow rotatable member co-axial with and connecting said conduits, said hollow member comprising an impeller casing formed as a cylinder, an impeller unit arranged within and replaceably fixed to the cylinder, means for closing one end of the cylinder, a removable end plate fixed to and closing the other end of the cylinder, electric motor rotor parts mounted externally on said cylinder to rotate therewith and a stationary outer casing surrounding said cylinder and having mounted thereon motor stator parts co-operating with said rotor parts to form an operative electric motor therewith; said outer casing being formed at the side adjacent said end plate with an opening permitting the removal of said end plate; and axially displaceable supporting means for said end plate permitting said end plate to be displaced without displacement of said cylinder.

2. A centrifugal rotary pumping apparatus comprising fixed co-axial inlet and outlet conduits, a hollow rotatable member co-axial with and connecting said conduits, said hollow member comprising an impeller casing formed as a cylinder, a replaceable impeller unit arranged within the cylinder and fixed to the inlet side thereof, a plate closing the inlet side of the cylinder, a removable end plate fixed to and closing the side of the cylinder opposite said impeller, and electrical motor rotor parts mounted externally on said cylinder to rotate therewith; a replaceable fluid receiving unit fixed to said outlet conduit and projecting into said cylinder through an aperture in said end plate; a stationary outer casing surrounding said cylinder and having mounted thereon electric motor stator parts co-operating with said rotor parts to form an operative electric motor therewith; said outer casing being formed at the side adjacent said end plate with an opening permitting the removal of said end plate; and axially displaceable supporting means for said end plate and said fluid receiving unit permitting said plate and said unit to be displaced without displacement of said cylinder.

3. A centrifugal rotary pumping apparatus comprising fixed co-axial inlet and outlet conduits, a hollow rotatable member co-axial with and connecting said conduits, said hollow member comprising an impeller casing formed as a cylinder, an impeller unit arranged within and replaceably fixed to the cylinder; said impeller having an inlet opening, discharge mouths and a plurality of substantially equal passages separated by vanes and extending wholly within said impeller; each such impeller passage extending from said inlet opening in a double curve and terminating parallel with the cylinder axis at one of said discharge mouths; means for closing one end of the cylinder; a removable end plate fixed to and closing the other end of the cylinder, electrical motor rotor parts mounted externally on said cylinder to rotate therewith and a stationary outer casing surrounding said cylinder and having mounted thereon motor stator parts co-operating with said rotor parts to form an operative electric motor therewith, said outer casing being formed at the side adjacent said end plate with an opening permitting the removal of said end plate; and axially displaceable supporting means for said end plate permitting said end plate to be displaced without displacement of said cylinder.

4. A centrifugal rotary pumping apparatus comprising fixed co-axial inlet and outlet conduits, a hollow rotatable member co-axial with and connecting said conduits, said rotatable member comprising an impeller casing formed as a cylinder, an impeller unit arranged within the cylinder and replaceably fixed to the inlet side thereof, said impeller having an inlet opening, discharge mouths and a plurality of substantially equal passages separated by vanes and extending wholly within said impeller; each such impeller passage extending from said inlet opening in a double curve and terminating parallel with the cylinder axis at one of said discharge mouths; means for closing the end of the cylinder adjacent to the impeller; a removable end plate fixed to and closing the side of the cylinder opposite said impeller, and electrical motor rotor parts mounted externally on said cylinder to rotate therewith; a replaceable fluid receiving unit fixed to said outlet conduit and projecting into said cylinder through an aperture in said end plate; a stationary outer casing surrounding said cylinder and having mounted thereon electric motor stator parts co-operating with said rotor parts to form an operative electric motor therewith; said outer casing being formed at the side adjacent said end plate with an opening permitting the removal of said end plate; and axially displaceable supporting means for said end plate and said fluid receiving unit permitting said plate and said unit to be displaced without displacement of said cylinder.

CEBERT BOARDMAN.
ARTHUR CYRUS WHITTOME.